United States Patent [19]

Schmitt et al.

[11] Patent Number: 4,761,260
[45] Date of Patent: Aug. 2, 1988

[54] NUCLEAR POWER PLANT WITH A HIGH TEMPERATURE REACTOR LOCATED IN A CYLINDRICAL PRESTRESSED CONCRETE PRESSURE VESSEL

[75] Inventors: Hermann Schmitt, Winnweiler; Josef Schoening, Hambruecken, both of Fed. Rep. of Germany

[73] Assignee: Hochtemperatur-Reaktorbau GmbH, Fed. Rep. of Germany

[21] Appl. No.: 66,464

[22] Filed: Jun. 26, 1987

[30] Foreign Application Priority Data

Jun. 27, 1986 [DE] Fed. Rep. of Germany ....... 3621516

[51] Int. Cl.$^4$ ........................................... G21C 15/18
[52] U.S. Cl. .................................. 376/298; 376/293; 376/299; 376/317; 376/381; 376/402
[58] Field of Search ............... 376/293, 298, 299, 317, 376/381, 402

[56] References Cited

U.S. PATENT DOCUMENTS

| 2,812,303 | 11/1957 | Daniels | 376/381 |
| 3,461,034 | 8/1969 | Fortescue | 376/298 |
| 4,113,559 | 9/1978 | Schweiger | 376/299 |
| 4,244,153 | 1/1981 | Schwarzer et al. | 376/293 |
| 4,299,660 | 11/1981 | Quade | 376/317 |
| 4,343,681 | 8/1982 | Clermont et al. | 376/381 |
| 4,382,908 | 5/1983 | Petersen | 376/299 |
| 4,664,871 | 5/1987 | Schöning | 376/391 |
| 4,689,194 | 8/1987 | Wachholz et al. | 376/299 |

FOREIGN PATENT DOCUMENTS

| 1115846 | 10/1961 | Fed. Rep. of Germany | 376/299 |
| 3344527 | 6/1985 | Fed. Rep. of Germany | |
| 3518968 | 11/1986 | Fed. Rep. of Germany | |
| 0145890 | 11/1979 | Japan | 376/298 |
| 1297951 | 11/1972 | United Kingdom | 376/298 |

Primary Examiner—Deborah L. Kyle
Assistant Examiner—Richard Wendtland
Attorney, Agent, or Firm—Robert J. Koch

[57] ABSTRACT

A nuclear power plant (heating plant) with a helium cooled high temperature reactor with spherical fuel elements, located in a cylindrical prestressed concrete pressure vessel, suitable for supplying heat (for local or remote heating or the generation of process steam) with a capacity of approximately 50 to 300 MWth. The high temperature reactor core is located out of center in the prestressed concrete pressure vessel, with at least two heat exchangers installed adjacent and offset in the upward direction relative to it. The heat exchangers are each connected on the secondary side to an intermediate circulation loop including an intermediate heat exchanger and circulating pump, and have an auxiliary circulation loop with a recooling system connected in parallel with them for the removal of decay heat. The auxiliary loops are closed in normal operation.

11 Claims, 3 Drawing Sheets

NUCLEAR POWER PLANT WITH A HIGH TEMPERATURE REACTOR LOCATED IN A CYLINDRICAL PRESTRESSED CONCRETE PRESSURE VESSEL

BACKGROUND OF THE INVENTION

1. Field of the Invention

The invention relates to a nuclear power plant with a cylindrical prestressed concrete pressure vessel and more particularly to an installation with a pressure vessel comprising a cavity clad on the inside with a liner, with a high temperature reactor, the core whereof is formed by spherical fuel elements through which helium flows from top to bottom as the cooling gas and a graphite reflector surrounding the core on all sides. A plurality of absorber rods are insertable into the lateral graphite reflector. Additional tubes are located above the pellet pile for introducing the spherical fuel elements to the pile and a pellet removal tube is provided in the bottom part of the graphite reflector. Heat exchangers are located in the cavity within the pressure vessel and circulating blowers are arranged subsequent to said heat exchangers in the helium or coolant flow path.

2. Description of the Related Technology

The nuclear power plant shown in ED-OS 33 44 527 incorporated by reference herein, is equipped with a large number of steam generators, grouped around a centrally located reactor. The heat obtained is utilized primarily in several secondary water-steam loops for power generation. The nuclear power plant has a capacity of approximately 300 to 600 MWel. A high temperature reactor with spherical fuel elements, particularly suitable for the generation of thermal energy for heating purposes with a capacity of 10–20 MWel is described in DE-P35 18 968.1 also incorporated by reference herein. In this so-called heating reactor, active operating installations, such as charging means, control systems and safety systems, may be largely eliminated. The reactor is located in a steel reinforced concrete pressure vessel installed underground. In view of its low maintenance requirements, the reactor is suitable for use in less industrialized and sparsely populated areas having lower thermal energy needs. If higher capacities are required, for example for large heating networks to supply local and remote areas, the multiplication of such heating reactors is economically limited.

SUMMARY OF THE INVENTION

It is an object of the invention to provide a nuclear power plant with a simplified configuration and capacity of approximately 50 to 300 MWth, capable of delivering heat to a supply network and operating economically, while observing all safety requirements.

According to the invention, the attachment of this object may be achieved by an installation having characteristics as follows:

a. a high temperature reactor located out of the center of the cavity;

b. at least two heat exchangers, each associated with a circulating blower are installed parallel to each other adjacent to the high temperature reactor in the cavity, said heat exchangers may be offset in height upwards relative to the high temperature reactor;

c. each heat exchanger may be connected on the secondary side with an intermediate loop operated with water. The intermediate loop may comprise an intermediate heat exchanger and a circulating pump outside the prestressed concrete pressure vessel;

d. the heat exchangers are intended for the operational transfer of heat by the intermediate loops and for the removal of decay heat; and e. an auxiliary loop may be connected in parallel to each intermediate loop, the auxiliary loop comprising a recooling system.

In the nuclear power plant (heating plant) proposed herein and designed for the production of heat only and not for power (electric) generation, adequate availability is assured by the presence of at least two heat exchangers. Additionally, the raising of the heat exchangers into an elevated position enables removal of heat by natural convection in case of a failure of the circulating blowers.

The nuclear power plant is characterized by its simple configuration and simple operation, and by the fact that it is highly economical. It has all of the advantages inherent in a high temperature reactor (negative temperature and power coefficients, the use of helium as the cooling medium, low power density/heat capacity ratio, high thermal resistance of the core installations and the fuel elements, low rate of the release of fission products).

The nuclear power plant is particularly suitable for capacities of 125 and 250 MWth. It is, however, flexible with regard to output, so that it may be used for higher or lower capacity needs.

Further advantageous features include a recooling system which comprises an elevated reservoir located in the auxiliary loop and filled with water. An auxiliary heat exchanger and a wet cooling tower may be connected by a further loop to the auxiliary heat exchanger. The heat capacity of the recooling system is such that a single recooling system is capable of removing heat in all operating and accidental cases. Each elevated reservoir may include a blow-off line equipped with a pressure relief valve. A supply system for local and remote heating may be connected to the secondary side of each intermediate heat exchanger.

The installation may include apparatus for transferring process steam from the nuclear power plant by the secondary side of each intermediate heat exchanger. Additionally, the prestressed concrete pressure vessel and the components of the intermediate and auxiliary circulation loop with the exception of the wet cooling towers may be enclosed in a protective reactor building. The important systems of the nuclear power plant, such as the intermediate and auxiliary loops may be protected by bunkers, while the other parts of the installation are housed in buildings of conventional construction. A cooling system for the cavity liner may be laid out in a manner such that it is capable of independently removing all of the decay heat. The high temperature reactor may advantageously be operated by charging fuel elements according to a single passage process.

DETAILED DESCRIPTION OF THE PREFERRED EMBODIMENT

Figure 1:
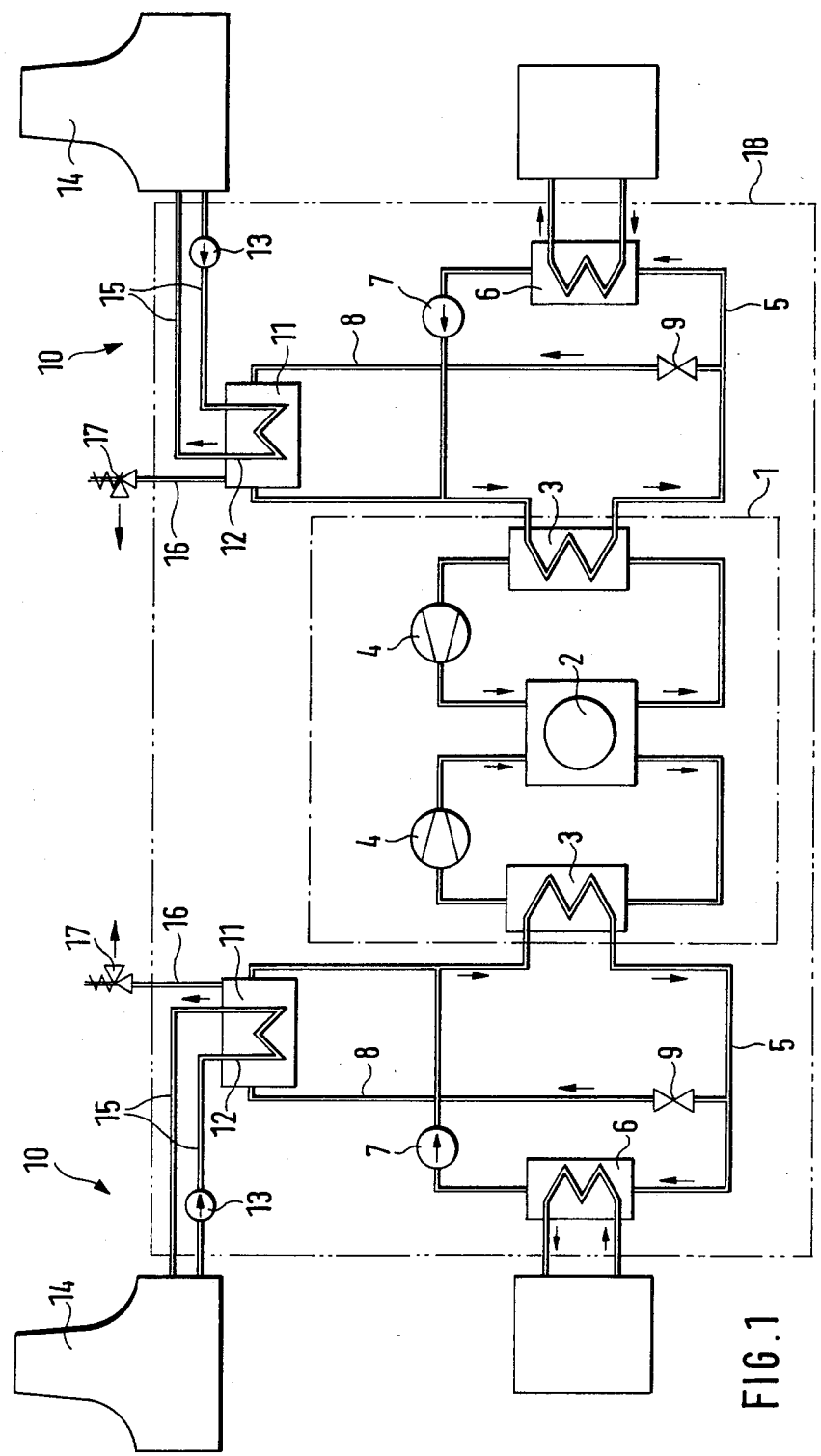
FIG. 1 shows a circulation diagram for a nuclear power heating plant according to the invention.

FIG. 1 shows a high temperature reactor 2 in a cylindrical prestressed concrete pressure vessel 1. There is a downward flow of helium utilized as a cooling medium through the reactor. Two heat exchangers 3 are located within the helium loop and a circulating blower 4 is connected in succession of down line from each heat exchanger. The secondary side of each heat exchanger 3 is connected to an intermediate circulation loop 5. An intermediate heat exchanger 6 and a circulating pump 7 of the loop 5 arelocated outside the prestressed concrete pressure vessel 1. The secondary side of each intermediate heat exchanger 6 may be connected to a supply network for local or remote heating. The heat removed from the reactor 2 may also be used for production of process steam.

Each of the heat exchangers 3 are simultaneously intended for both operational supply of heat and removal of decay heat. The nuclear power plant is equipped with two auxiliary circulating loops 8, each connected in parallel to one of the two intermediate circulating loops 5 for this purpose. In normal operation the two auxiliary loops 8 are closed off by a respective shut-off fitting 9. Each of the auxiliary loops 8 contain a recooling system 10 with an elevated reservoir 11 filled with water, an auxiliary heat exchanger 12, a circulating pump 13 and a wet cooling tower 14. The wet cooling tower 14 is connected to an auxiliary heat exchanger 12 located in the elevated reservoir 11 by a circulating loop 15. In addition, each elevated reservoir 11 is equipped with a blow-off line 16 with a pressure relief valve 17.

The heat capacity of each of the two recooling systems 10 is such that a single recooling system is sufficient to remove all of the heat generated in all operating and accidental cases. Each of the two elevated reservoirs 11 is capable of containing a volume of water such that over a period of several hours the heat may be removed by evaporation alone, i.e., without recooling by the auxiliary heat exchanger 12.

Figure 3:
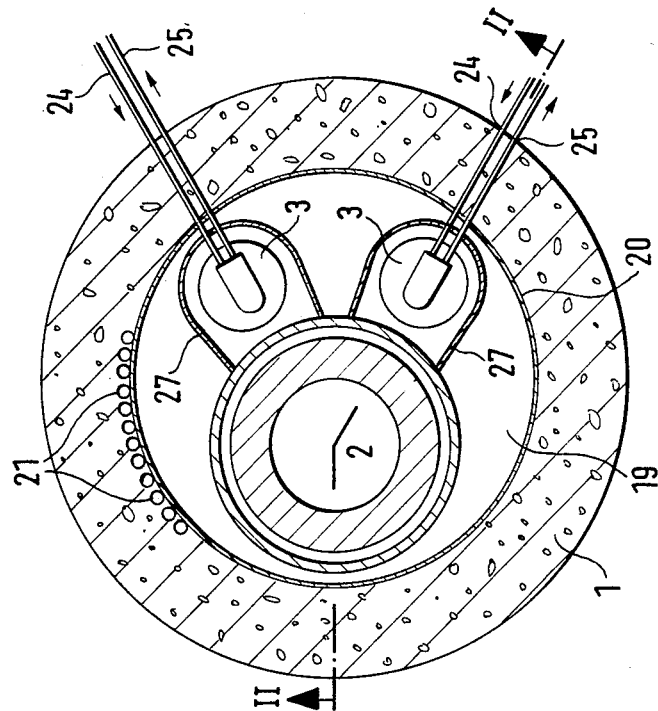
FIG. 3 shows a horizontal section on the line III—III of FIG. 2.
Figure 2:
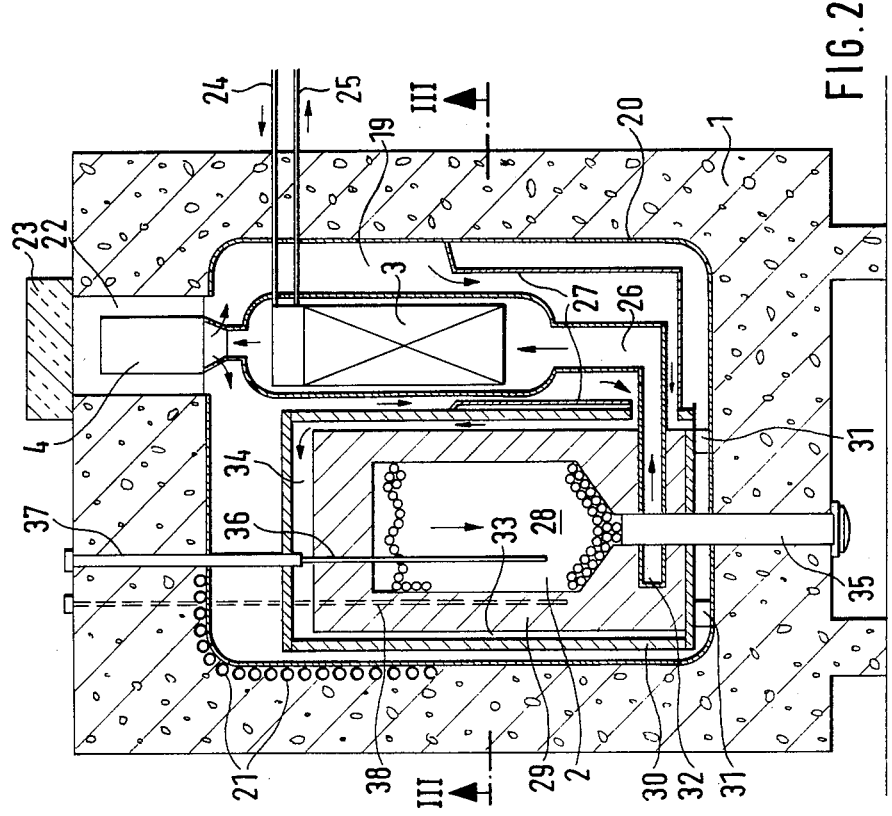
FIG. 2 shows a vertical section on the line II—II of FIG. 3 through the part of the nuclear power plant located in the prestressed concrete pressure vessel.

FIGS. 2 and 3 illustrate the part of the installation located within the prestressed concrete pressure vessel in detail. The components are installed in a large cavity 19. The cavity 19 is lined with a metal liner 20. The liner 20 comprises a cooling system 21 partially shown in the figures. This cooling system is designed so that all of the decay heat may thereby by removed. There are two passages 22 in the cover or roof part of the prestressed concrete pressure vessel 1. Each passage is closed by a cover 23. The circulating blowers 4 are installed in the passages 22.

The high temperature reactor 2 is located out of center in the cavity 19 as shown by FIG. 3. The two heat exchangers 3 are placed or suspended parallel to each other adjacent to the high temperature reactor 2. They are upwardly offset relative to the height of the reactor core. This has the advantage that heat may be removed by natural convection in case of a failure of the circulating blowers 4.

Each heat exchanger 3 is connected to its secondary circulation loop 5 located outside the prestressed concrete pressure vessel 1 by an inlet line 24 and an outlet line 25 for the secondary medium. The hot helium is conducted to the heat exchangers 3 by a gas conduit 26 from below the core. The cooled helium compressed in the circulating blowers 4 is then returned into the high temperature reactor 2 by the gas conduction installations 27.

The core of the high temperature reactor 2 has a pile 28 of spherical fuel elements enclosed on all sides by a graphite reflector 29. The reflector 29 is surrounded by a thermal shield 30. The bottom part of the thermal shield 30 is supported by a plurality of bearings 31 on the bottom part of the prestressed concrete pressure vessel 1. A hot gas collector space 32 is located under the bottom part of the graphite reflector 29. The gas conduits 26 are connected to the hot gas collector space. The cold compressed helium enters an annular space 33 through orifaces in the thermal shield 30 defined between the shield and the lateral part of the graphite reflector 29. The cold helium flows upward toward a cold gas collector space 34.

Several additional tubes (not shown) are provided above the core to introduce fuel elements into the pile 28. Fuel elements are removed from the pile 28 through the pellet removal tube 35, which extends through the bottom part of the graphite reflector 29 and the prestressed pressure vessel 1. Fuel element charging is preferably carried out in a manner such that the fuel elements reach their final burn-up state after a single passage through the pile 28, i.e., they are introduced only once into the reactor.

The high temperature reactor 2 is equipped with two different systems for control and shutdown. One system is a plurality of core rods 36 directly insertable into the pile 28 and guided above the roof part of the graphite reflector 29 in tubes 37. The core rods 36 are intended for long term shutdowns. The second system is intended for control and rapid shutdown of the high temperature reactor 2. It comprises a plurality of reflector rods 38, i.e., absorber rods displaceable in bore holes of the lateral graphite reflector, as indicated in FIG. 2.

Figure 4:
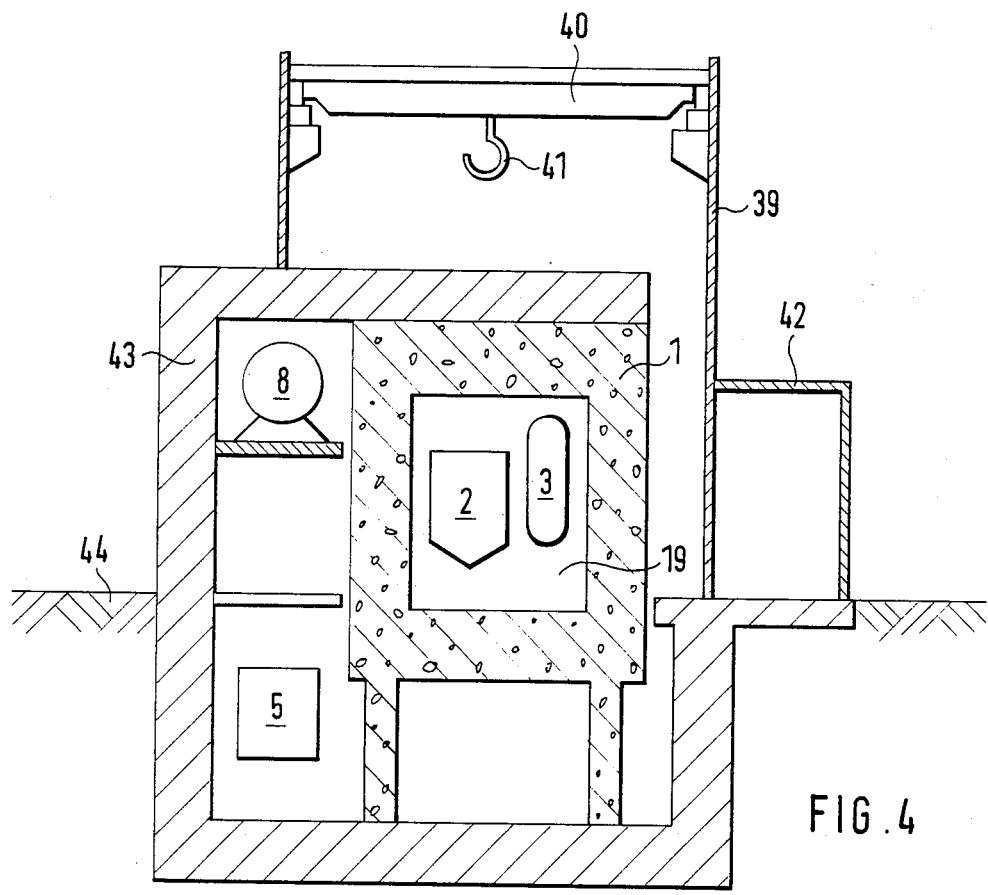
FIG. 4 shows a detailed view of the building enclosure shown schematically in FIG. 1.

FIG. 4 shows in detail an enclosed schematically indicated in FIG. 1. The nuclear power plant is enclosed by a protective reactor building. The high temperature reactor 2 and the heat exchangers 3 are installed adjacent to each other in a single cavity 19 of the prestressed concrete pressure vessel 1. All of the structures which do not contain important systems are built by conventional methods. These include the reactor hall 39. A crane 41 on rails 40 is provided in the hall 39 for installation and dismantling operations. A further building 42 of a similar configuration may contain shop or operating space. Important systems, such as the intermediate loops 5 and the auxiliary loops 8 are protected by bunkers 43 against external effects. Such effects may include collisions of aircraft or the like. The parts of the plants containing the prestressed concrete pressure vessel and the aforementioned systems are installed in part below ground 44.

We claim:
1. A nuclear power plant comprising:
   a cylindrical prestressed concrete pressure vessel defining a cavity exhibiting a liner;
   a high temperature reactor arranged out of center in said cavity;
   a pile of spherical fuel elements arranged in a core of said reactor;
   said reactor including a graphite reflector surrounding and defining said core, and means for inserting a plurality of absorber rods into a latteral portion of said reflector and into said core;

means for introducing fuel elements to said reactor located above said core and means for removing fuel element from said reactor located below said core;

at least two primary heat exchangers arranged in parallel, and adjacent to said reactor and elevated with respect to said core wherein each primary heat exchanger has sufficient capacity for full removal of operational and decay heat;

a blower associated with each primary heat exchanger arranged in a coolant flow path subsequent to said primary heat exchanger and configured for downward coolant flow through said pile;

an intermediate circulation loop connected to a secondary side of each primary heat exchanger, exhibiting a circulating pump and a intermediate heat exchanger;

an auxiliary circulation loop connected to said intermediate circulation loop and exhibiting a recooling system and means for normal operation shutoff of said auxiliary circulating loop.

2. A nuclear power plant according to claim 1, wherein each recooling system comprises an elevated water filled reservoir located in the auxiliary loop and an auxiliary heat exchanger connected to a wet cooling tower by a recooling loop.

3. A nuclear power plant according to claim 2, wherein each recooling system exhibits a heat capacity capable of removing heat in all operating and accidental cases.

4. A nuclear power plant according to claim 2, wherein each elevated reservoir comprises a blow-off line equipped with a pressure relief valve.

5. A nuclear power plant according to claim 1, further comprising a heating supply system connected to the secondary side of each intermediate heat exchanger.

6. A nuclear power plant according to claim 1, further comprising means for conveying process steam from the nuclear power plant connected to the secondary side of each intermediate heat exchanger.

7. A nuclear power plant according to claim 2, further comprising:
a protective reactor building enclosing the prestressed concrete pressure vessel and all components of said intermediate and auxiliary circulation loops other than said wet cooling towers.

8. A nuclear power plant according to claim 2, further comprising bunkers housing the intermediate and auxiliary loops, and conventional construction housing less important installations.

9. A nuclear power plant according to claim 1, further comprising a cavity liner cooling system capable of removing all decay heat.

10. A nuclear power plant according to claim 1, further comprising means for single passage fuel element charging of said pile associated with said core.

11. A nuclear power plant according to claim 1, further comprising bunkers housing said intermediate and auxiliary circulation loops, and buildings of conventional construction housing less important installations.

* * * * *